United States Patent
Song et al.

(10) Patent No.: US 7,328,913 B2
(45) Date of Patent: Feb. 12, 2008

(54) LOW RISK DEPLOYMENT PASSENGER AIRBAG SYSTEM

(75) Inventors: Seung-Jae Song, Novi, MI (US); Miyoung Jang, Novi, MI (US); Jong Seop Nam, Commerce Township, MI (US)

(73) Assignee: CIS Tech, LLC, Novi, MI (US)

( * ) Notice: Subject to any disclaimer, the term of this patent is extended or adjusted under 35 U.S.C. 154(b) by 0 days.

(21) Appl. No.: 11/264,267

(22) Filed: Nov. 1, 2005

(65) Prior Publication Data

US 2006/0103121 A1    May 18, 2006

Related U.S. Application Data

(60) Provisional application No. 60/628,434, filed on Nov. 15, 2004.

(51) Int. Cl.
*B60R 21/16* (2006.01)

(52) U.S. Cl. .................. 280/732; 280/728.3; 280/740

(58) Field of Classification Search ............. 280/728.3, 280/732, 740, 743.1, 728.2
See application file for complete search history.

(56) References Cited

U.S. PATENT DOCUMENTS

| | | | |
|---|---|---|---|
| 2,834,606 A | 5/1958 | Bertrand | |
| 3,610,657 A | 10/1971 | Cole | 280/150 AB |
| 3,642,303 A | 2/1972 | Irish et al. | 280/150 AB |
| 3,643,971 A * | 2/1972 | Kushnick | 280/732 |
| 3,664,682 A | 5/1972 | Wycech | |
| 3,767,225 A | 10/1973 | Mazelsky | 280/150 A |
| 3,784,225 A | 1/1974 | Fleck et al. | 280/150 AB |
| 3,819,204 A | 6/1974 | Oka et al. | 280/150 AB |
| 3,951,427 A * | 4/1976 | Wilfert | 280/732 |
| 4,043,572 A | 8/1977 | Hattori et al. | 280/738 |
| 4,148,503 A * | 4/1979 | Shiratori et al. | 280/731 |
| 4,169,613 A | 10/1979 | Barnett | 280/732 |
| 4,290,627 A | 9/1981 | Cumming et al. | 280/729 |
| 4,360,223 A | 11/1982 | Kirchoff | 280/729 |
| 4,773,673 A * | 9/1988 | Sakurai | 280/728.3 |
| 5,084,122 A * | 1/1992 | Fukushima et al. | 156/252 |
| 5,240,283 A | 8/1993 | Kishi et al. | 280/729 |
| 5,310,214 A | 5/1994 | Cuevas | 280/729 |

(Continued)

FOREIGN PATENT DOCUMENTS

DE    43 04 152 A1    8/1993

(Continued)

*Primary Examiner*—Eric Culbreth
(74) *Attorney, Agent, or Firm*—Gifford, Krass, Sprinkle, Anderson & Citkowski, P.C.

(57) ABSTRACT

A passenger airbag system is designed for an automotive vehicle with a passenger compartment, a windshield and an instrument panel disposed between the passenger compartment and the windshield. The instrument panel has a top portion with a surface which is more horizontal than vertical and generally directed toward the windshield and a mid-portion with a surface that is more vertical than horizontal and generally directed toward an occupant of the passenger compartment. The system includes a single airbag housing that is disposed in the instrument panel and extends from the top portion to the mid-portion. The airbag cushion is deployable from the housing through the instrument panel along a predetermined path for direct contact with an occupant seated in the passenger compartment. The predetermined path is generally radial with respect to the surface of the instrument panel.

18 Claims, 12 Drawing Sheets

U.S. PATENT DOCUMENTS

| | | | |
|---|---|---|---|
| 5,405,164 A * | 4/1995 | Paxton et al. | 280/728.2 |
| 5,439,246 A * | 8/1995 | Ravenberg et al. | 280/728.3 |
| 5,480,184 A | 1/1996 | Young | 280/731 |
| 5,513,877 A | 5/1996 | Mac Brien et al. | 280/732 |
| 5,558,300 A | 9/1996 | Kalberer et al. | 244/121 |
| 5,564,731 A * | 10/1996 | Gallagher et al. | 280/728.3 |
| 5,577,765 A | 11/1996 | Takeda et al. | 280/729 |
| 5,711,545 A * | 1/1998 | Wehner | 280/728.3 |
| 5,752,715 A | 5/1998 | Pripps et al. | 280/740 |
| 5,775,729 A | 7/1998 | Schneider et al. | 280/730.1 |
| 5,775,730 A | 7/1998 | Pripps et al. | 280/729 |
| 5,803,485 A | 9/1998 | Acker et al. | 280/728.2 |
| 5,873,598 A * | 2/1999 | Yoshioka et al. | 280/740 |
| 5,913,534 A * | 6/1999 | Klingauf | 280/728.3 |
| 5,941,558 A * | 8/1999 | Labrie et al. | 280/728.3 |
| 5,961,142 A * | 10/1999 | Shiraki et al. | 280/728.3 |
| 5,967,551 A * | 10/1999 | Newkirk et al. | 280/740 |
| 6,059,312 A | 5/2000 | Staub et al. | 280/729 |
| 6,065,771 A * | 5/2000 | Kawakubo et al. | 280/728.3 |
| 6,079,733 A * | 6/2000 | Towler | 280/728.3 |
| 6,095,273 A | 8/2000 | Aboud et al. | 180/90 |
| 6,106,003 A * | 8/2000 | Rahmstorf et al. | 280/728.3 |
| 6,158,765 A | 12/2000 | Sinnhuber | 180/90 |
| 6,209,908 B1 | 4/2001 | Zumpano | 280/729 |
| 6,213,496 B1 | 4/2001 | Minami et al. | 280/729 |
| 6,224,088 B1 | 5/2001 | Lohavanijaya | 280/728.2 |
| 6,276,716 B1 | 8/2001 | Kato | 280/735 |
| 6,340,174 B1 * | 1/2002 | Takagi et al. | 280/736 |
| 6,431,583 B1 | 8/2002 | Schneider | 280/728.2 |
| 6,431,586 B1 | 8/2002 | Eyrainer et al. | 280/730.1 |
| 6,505,851 B2 | 1/2003 | Frisch | 280/728.3 |
| 6,513,829 B1 | 2/2003 | Zumpano | 280/730.1 |
| 6,523,855 B2 | 2/2003 | Musiol et al. | 280/729 |
| 6,536,799 B2 | 3/2003 | Sinnhuber et al. | 280/729 |
| 6,581,958 B2 * | 6/2003 | Holtz | 280/728.3 |
| 6,616,177 B2 | 9/2003 | Thomas et al. | 280/729 |
| 6,616,182 B2 * | 9/2003 | Woolley et al. | 280/732 |
| 6,676,147 B2 | 1/2004 | Ozaki et al. | 280/240 |
| 6,679,522 B2 | 1/2004 | Igawa | 280/743.1 |
| 6,702,322 B2 | 3/2004 | Eyrainer et al. | 280/730.1 |
| 6,709,009 B1 | 3/2004 | Michael et al. | 280/729 |
| 6,836,715 B2 | 12/2004 | Sakai et al. | 701/45 |
| 6,871,872 B2 * | 3/2005 | Thomas | 280/736 |
| 6,896,310 B1 * | 5/2005 | Trappe et al. | 296/70 |
| 2002/0001774 A1 | 1/2002 | Je et al. | 430/270.18 |
| 2002/0005633 A1 | 1/2002 | Amamori | 280/729 |
| 2002/0014759 A1 * | 2/2002 | Desprez | 280/728.3 |
| 2002/0020990 A1 | 2/2002 | Sinnhuber et al. | 280/729 |
| 2002/0024200 A1 | 2/2002 | Eckert et al. | 280/729 |
| 2002/0109341 A1 | 8/2002 | Eckert et al. | 280/743.1 |
| 2002/0125690 A1 | 9/2002 | Boll et al. | 280/730.1 |
| 2002/0149185 A1 * | 10/2002 | Lutz et al. | 280/740 |
| 2002/0185845 A1 | 12/2002 | Thomas et al. | 280/729 |
| 2002/0195800 A1 * | 12/2002 | Florsheimer | 280/728.3 |
| 2003/0015861 A1 | 1/2003 | Abe | 280/730.1 |
| 2003/0030254 A1 | 2/2003 | Hasebe | 280/729 |
| 2003/0034637 A1 | 2/2003 | Wang et al. | 280/729 |
| 2003/0034638 A1 | 2/2003 | Yoshida | 280/729 |
| 2003/0034639 A1 | 2/2003 | Amamori | 280/729 |
| 2003/0094794 A1 | 5/2003 | Amamori | 280/729 |
| 2003/0116945 A1 | 6/2003 | Abe | 280/729 |
| 2003/0132621 A1 * | 7/2003 | Arieth et al. | 280/732 |
| 2003/0218319 A1 | 11/2003 | Amamori | 280/729 |
| 2004/0012181 A1 * | 1/2004 | Kim et al. | 280/740 |
| 2004/0026904 A1 | 2/2004 | Yamazaki et al. | 280/730.1 |
| 2004/0026909 A1 | 2/2004 | Rensinghoff | 280/732 |
| 2004/0046369 A1 | 3/2004 | Michael et al. | 280/729 |
| 2004/0046370 A1 | 3/2004 | Reiter et al. | 280/729 |
| 2004/0070181 A1 * | 4/2004 | Hayashi et al. | 280/728.3 |
| 2004/0090050 A1 | 5/2004 | Dominissini et al. | 280/730.1 |
| 2004/0100073 A1 | 5/2004 | Bakhsh et al. | 280/730.1 |
| 2004/0100074 A1 | 5/2004 | Bakhsh et al. | 280/730.1 |
| 2004/0201205 A1 * | 10/2004 | Webber | 280/728.3 |

FOREIGN PATENT DOCUMENTS

| | | |
|---|---|---|
| GB | 2246983 A * | 2/1992 |
| JP | 011 32 444 A | 5/1989 |
| JP | 3-112748 | 5/1991 |
| JP | 051 39 232 A | 6/1993 |
| JP | 2000168486 A | 6/2000 |

* cited by examiner

LOW RISK DEPLOYMENT PASSENGER AIRBAG SYSTEM

REFERENCE TO RELATED APPLICATION

This patent application claims benefit from U.S. Provisional Patent Application Ser. No. 60/628,434, filed Nov. 15, 2004, the entire content of which is incorporated herein by reference.

FIELD OF THE INVENTION

This invention relates to a passenger airbag system for use with a motor vehicle. More specifically, an airbag housing extends from a top portion of the instrument panel to a mid portion of the instrument panel as a single unit in such a way as to minimize the risk of injuries caused by airbag inflation to out-of-position occupants while maintaining as effective of protection for in-position occupants during serious crashes as a conventional airbag.

BACKGROUND OF THE INVENTION

The conventional passenger airbag modules are mounted at a single location on the instrument panel, i.e. top portion, mid (front) portion, or somewhere in between. When the airbag cushion deploys, an out-of-position occupant who is very close to the airbag module at the time of the inflation can have a high risk of injuries caused by the concentrated force generated by the cushion deployment from the single location.

SUMMARY OF THE INVENTION

Preferred embodiments of an airbag module of the present invention have a long curved housing that extends from the top portion to the mid (front) portion of the instrument panel. The length of the housing measured in the vehicle's longitudinal direction is extended long enough to provide substantially distributed airbag inflation force into the occupant and thus significantly reduce the risk of injuries caused by the airbag inflation as a result. The airbag system of the present invention can also provide a much safer mode of radial airbag deployment approximately following the instrument panel surface compared to the conventional airbag system. This safer mode of radial deployment can significantly reduce the risk of neck injuries that are commonly seen from the out-of-position testing using the conventional airbags.

A first embodiment of the present invention provides a passenger airbag system for an automotive vehicle having a passenger compartment, a windshield, and an instrument panel disposed between the passenger compartment and the windshield. The instrument panel has a top portion with a surface which is more horizontal than vertical and generally directed toward the windshield and a mid-portion with a surface that is more vertical than horizontal and generally directed toward an occupant in the passenger compartment. The passenger airbag system includes a single airbag housing disposed in the instrument panel. The single housing extends from the top portion of the instrument panel to the mid-portion of the instrument panel. An airbag cushion is deployable from the housing through the instrument panel along a predetermined path for direct contact with an occupant seated in the passenger compartment. The predetermined path is generally radial with respect to the surface of the instrument panel. Preferably, the predetermined path substantially lacks a downward or upward directional component relative to the occupant. In some versions, the length of the housing measured in the longitudinal direction is at least 8 inches. In some versions the housing is curved to follow the contour of the instrument panel. In further versions, the surface area of the housing disposed on the top portion of the instrument panel is larger than the surface area of the housing disposed on the mid-portion of the instrument panel.

The present invention also provides a diffuser which may have multiple openings pointing different directions which can be used to evenly send the gas generated from an inflator into every part of the long and curved housing. The diffuser of the present invention can enhance the cushion deployment mode to be uniform and radial along the length of the housing. Furthermore, the amount of opening area for each direction can be made different to control the amount of gas in each direction and fine tune the cushion deployment mode. In one version of the first embodiment of the present invention, the airbag system further includes a single inflator and a diffuser disposed between the inflator and the airbag. The diffuser has at least two sets of openings and preferably has three sets of openings defined therethrough. A first set of openings is operable to direct gas flow into a top portion of the airbag cushion, a second set is operable to direct gas flow into a mid-portion of the airbag cushion, and a third set is operable to direct gas flow in a direction perpendicular to the instrument panel surface. The openings in each set define a total opening area for the surface. In some versions, the total opening area for at least one of the sets is different than the total opening area for the other sets. In yet other versions, the openings in one of the sets are larger than the openings in an adjacent one of the sets.

The airbag cushion of the present invention preferably needs to break out from a long and curved surface of the instrument panel. Conventional tear seams of U-type, I-type, and H-type can be modified to better suit the airbag system of the present invention. Modified tear seams have additional tear seam lines to the conventional ones, or have a combination of the conventional ones. The modified tear seams of the present invention can help the cushion break out easily and thus enhance the uniform and radial deployment mode. In further versions of the first embodiment of the present invention, the system includes an airbag system cover with a plurality of tear seams defined therein. The tear seams may include a longitudinal seam and at least three side-to-side seams intersecting the longitudinal seam. The side-to-side seams may be generally perpendicular to the longitudinal seam. These seams may further include at least two additional longitudinal tear seams that intersect the opposed ends of one of the side-to-side seams. In an alternative approach, the tear seams include a first longitudinal tear seam having a pair of ends, a pair of side-to-side tear seams intersecting the ends of the first seam, and four additional longitudinal tear seams that each intersect one of the opposed ends of the side-to-side tear seams.

A second embodiment of a passenger airbag system includes an airbag housing disposed in the instrument panel. The housing has a first edge that is disposed in the top portion of the instrument panel and an opposed second edge that is disposed in the mid-portion of the instrument panel. The airbag housing further has an airbag cushion-receiving surface extending between the first and second edges. An airbag cushion is deployable from the housing through the instrument panel. The airbag cushion is received in a non-deployed state on the airbag cushion-receiving surface of the airbag housing. The airbag cushion-receiving surface has a top portion adjacent the first edge and a front portion adjacent the second edge. The top portion and the front portion of the surface are angled with respect to each other, with the angle between the surfaces being at least 30 degrees. In some versions, the angle between the surfaces is at least 45 degrees, while in other versions it is at least 60 degrees, and in yet further versions the angle is at least 90 degrees. In some versions of this embodiment, the airbag is deployable along a predetermined path which is generally radial with respect to the surface of the instrument panel. In alternative versions, the first and second edges of the housing are spaced apart by a distance of at least 8 inches. The airbag cushion-receiving surface may be curved.

Another embodiment of the present invention provides an airbag system including a top-mounted airbag housing and a mid or front-mounted airbag housing, both of which have airbag cushions that are deployable through the instrument panel. The upper airbag cushion serving as a main airbag has a lower surface and the mid or front airbag cushion serving as a supporting airbag has an upper surface, with the surfaces being adjacent one another when the cushions are fully deployed. The surface is generally defined at the line of contact which is angled with respect to horizontal in the range of plus 30 degrees to minus 30 degrees. In further versions, the angle is in the range of plus 20 degrees to minus 20 degrees and in yet further versions it is in the range of plus 10 degrees to minus 10 degrees.

Another embodiment of the present invention provides an airbag system including a top-mounted airbag and a low-mounted airbag, both of which are deployable through the instrument panel along a predetermined path for direct contact with an occupant in the passenger compartment. The low mounted airbag is mounted in a lower portion of the instrument panel, which is generally directed toward the legs of the occupant. The top-mounted airbag deploys obliquely upward along the windshield and horizontally toward the occupant's upper torso, but lacks a substantial downwardly directed component. The top-mounted airbag, serving as a main airbag, effectively protects the head and upper torso of an in-position occupant and significantly reduces the risk of injuries caused by the airbag inflation to an out-of-position occupant and an infant riding in a rear facing child seat. The low-mounted airbag deploys first either obliquely or directly upward into the open space between the lower legs and glove box or lower portion of the instrument panel. The airbag further deploys into the open space created by occupant's lower torso, upper legs, the lower surface of the top-mounted airbag cushion, and the mid or front portion of the instrument panel. The low-mounted airbag protects the occupant's legs, knees, and lower torso, and also supports the top-mounted airbag.

BRIEF DESCRIPTION OF THE DRAWINGS

Advantages of the present invention will be readily appreciated as the same becomes better understood by reference to the following description when considered in connection with the accompanying drawings, wherein.

DETAILED DESCRIPTION OF THE INVENTION

Figure 1:
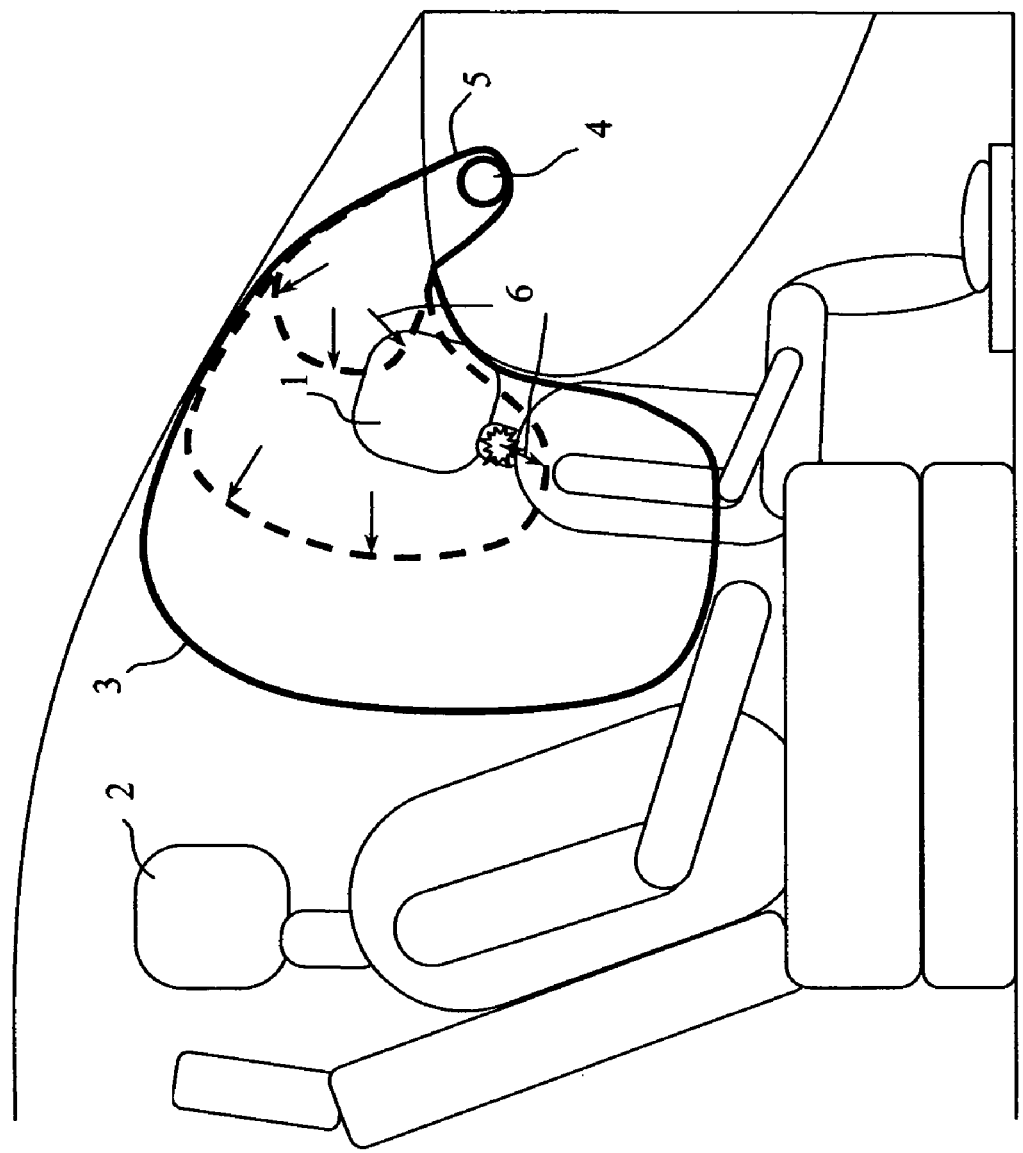
FIG. 1 is a side view of a conventional top-mounted passenger airbag with an out-of-position child dummy and an in-position adult dummy.

FIG. 1 shows a conventional passenger airbag module that is top-mounted in the instrument panel. The airbag cushion 3 deploys toward the head and torso areas of an adult occupant 2. During the airbag deployment, shown as dotted lines, the airbag can generate a substantially large component of downward deployment, as indicated by the arrows at 6. The component of downward deployment 6 can push the head of the out-of-position child 1 down and potentially cause a serious injury to the neck. The airbag module has a gas generating inflator 4, and a housing 5 that holds the inflator 4 and the airbag cushion 3.

Figure 2:
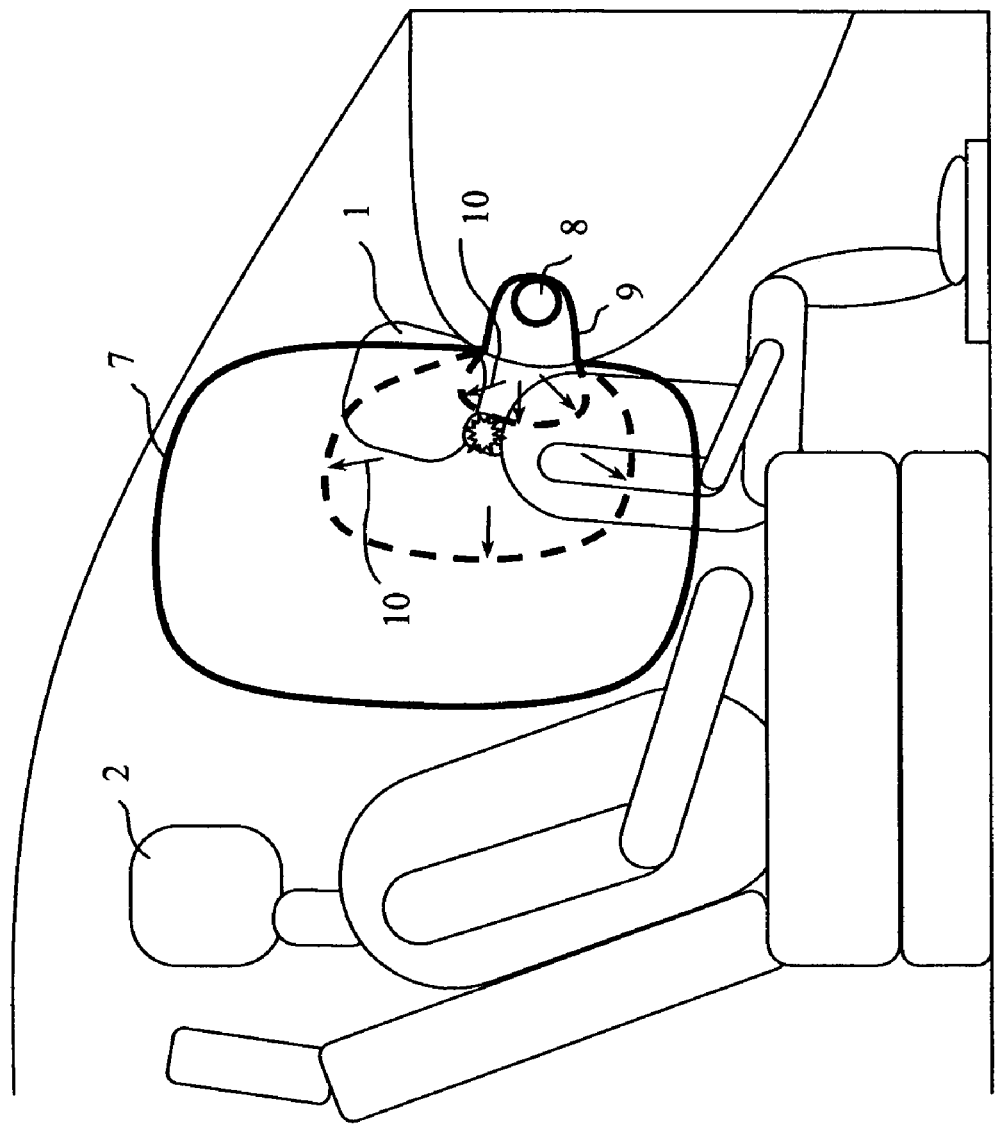
FIG. 2 is a side view of a conventional mid-mounted passenger airbag with an out-of-position child dummy and an in-position adult dummy.

FIG. 2 shows another conventional passenger airbag module that is mid-mounted in the instrument panel. The airbag module includes an airbag cushion 7, which deploys toward the head and torso areas of an adult occupant 2. During the airbag deployment, shown as dotted lines, the airbag 7 can generate a substantially large component of upward deployment, as indicated by the arrow 10, and can be trapped under the chin of an out-of-position child 1. The component of upward deployment 10 can push the chin up and potentially cause a serious injury to the neck. The airbag module also includes a gas generating inflator 8, and a housing 9 that holds the inflator 8 and the airbag cushion 7.

Figure 3:
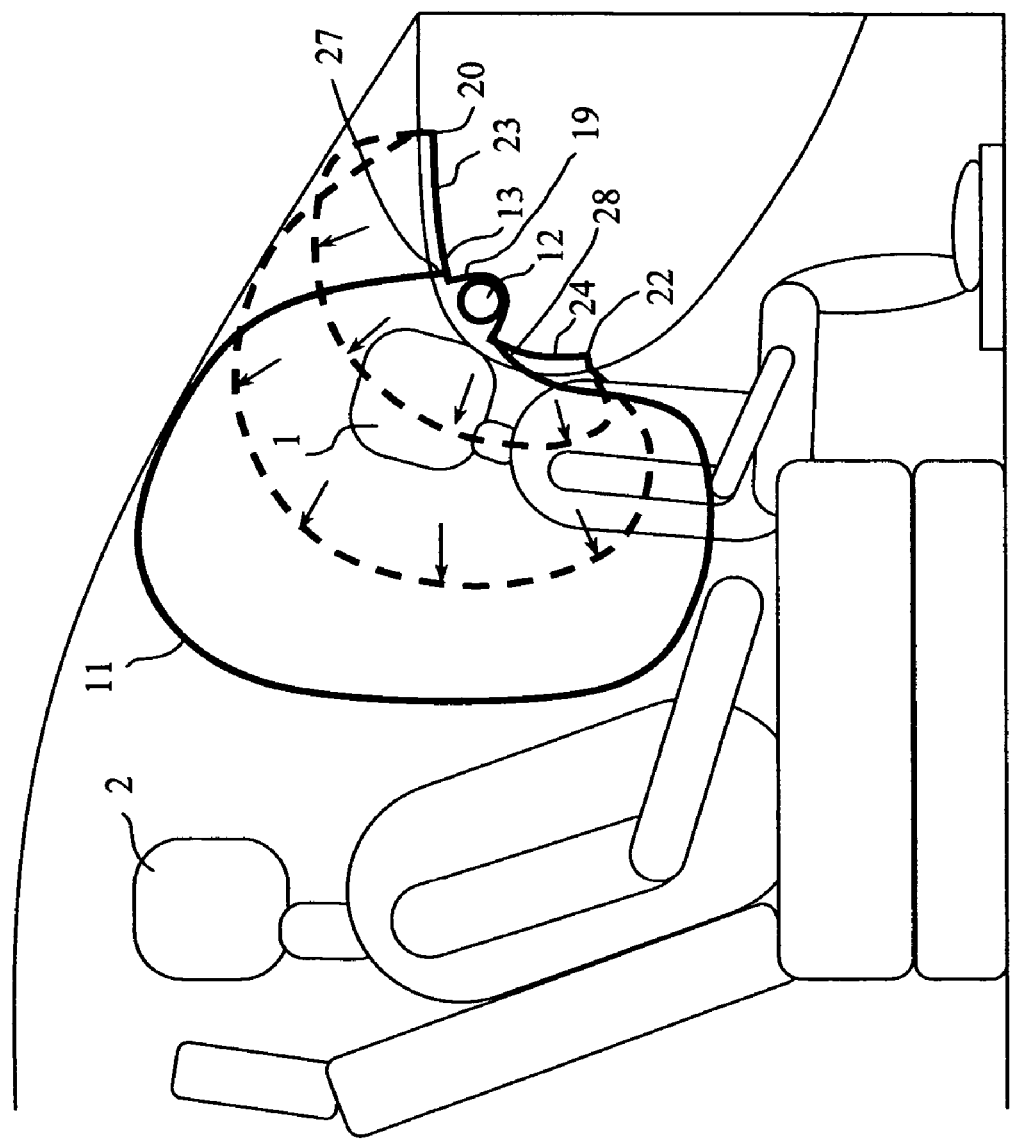
FIG. 3 is a side view of a passenger airbag according to one embodiment of the present invention with an out-of-position child dummy and an in-position adult dummy.

FIG. 3 shows a preferred embodiment of the present invention. The airbag system of the present invention generates a generally radial cushion deployment from the top portion to the mid (front) portion of the instrument panel, as shown by the dotted lines. This deployment mode can give two major benefits to out-of-position occupants. First, it provides a distributed force throughout the occupant body rather than a concentrated force that can be seen in conventional airbags, as shown in FIG. 1 and FIG. 2. The distributed force can lower the risk of injuries to out-of-position children and infants in child restraints. Second, the deployment mode is generally radial from the side view, approximately following the contour of the instrument panel. This radial deployment can reduce the risk of neck injuries significantly. In contrast, the deployment of conventional airbags has a substantial amount of risky downward or upward components near the neck area, as indicated by arrows in FIG. 1 and FIG. 2.

Figure 4:
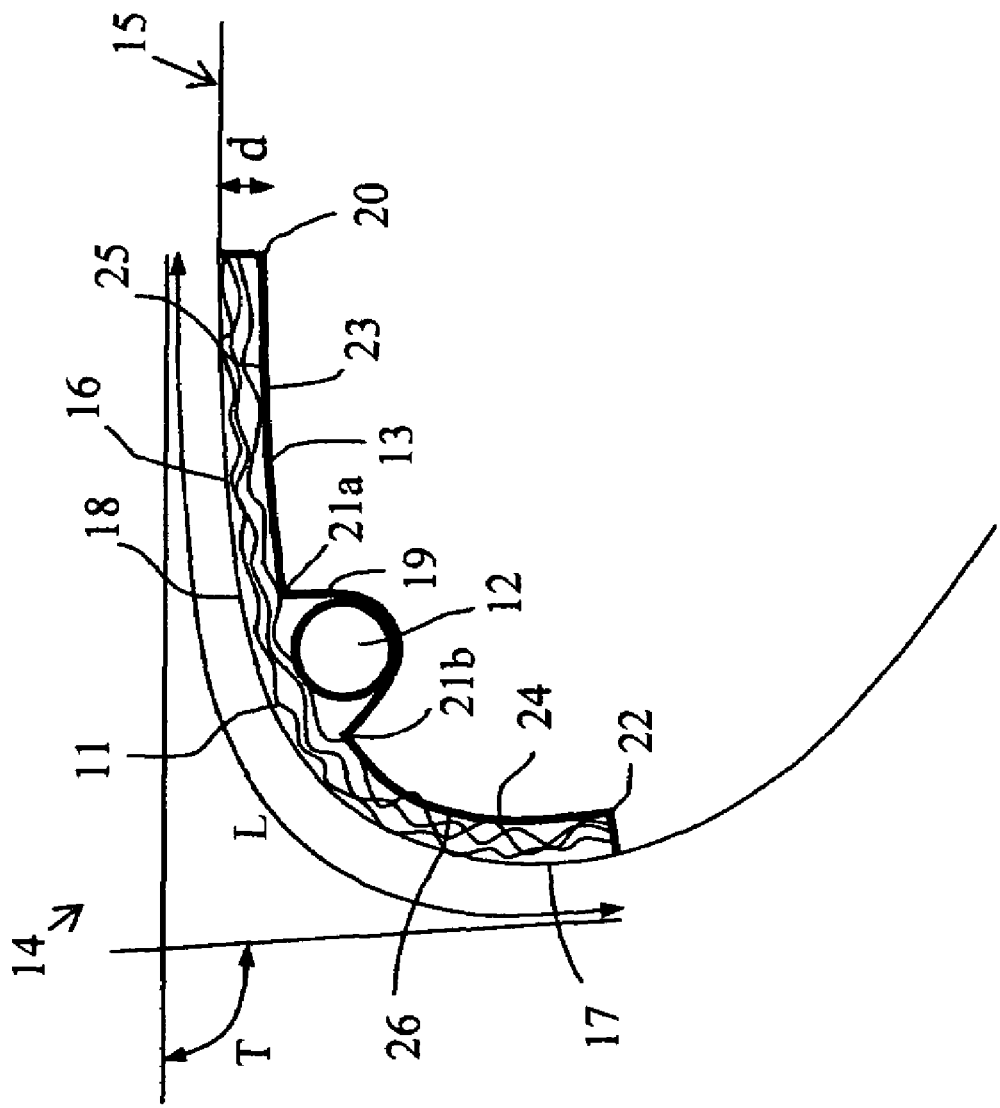
FIG. 4 is a side view of an embodiment of the present invention in which the airbag housing extends from the conventional top-mounted airbag location to the conventional mid-mounted airbag location.

FIG. 4 shows a preferred embodiment of the present invention before the airbag cushion is deployed. The passenger airbag system 14 includes a gas generating inflator 12, an airbag cushion 11, and a housing 13 that contains the inflator 12 and the airbag cushion 11. In the present invention, the housing 13 extends from a top portion 16 of the instrument panel 15 to a mid or front portion 17 of the instrument panel as a single unit. The airbag cushion 11 is covered by an instrument panel skin 18. The length of the housing 13 of the present invention measured in the vehicle's longitudinal direction is substantially larger than the conventional airbag housing. It is large enough to cover a substantial amount of both the top and the mid portions of the instrument panel. The length can be at least twice as large as that of conventional airbag housings in order to cover the location of a conventional top-mounted airbag and the location of a conventional mid-mounted airbag. For example, in some embodiments, the length L is at least 10 inches, while in further embodiments the length is at least 12 inches. It should be noted that the length L is measured generally in the longitudinal direction along the surface 18 of the instrument panel and therefore may be along the curved or an angled surface. The maximum length L is limited by functional considerations and by the size and shape of the instrument panel. A practical upper limit is 30 inches. One preferred length is in the range of 12-20 inches.

As used herein, the top of the instrument panel means the portion of the instrument panel with a surface that is generally more horizontal than vertical and generally faces the windshield. The mid or front portion of the instrument panel is the portion with a surface that is generally more vertical than horizontal and generally faces the occupant. As shown in FIGS. 3 and 4, the airbag housing 13 has a pair of opposed edges 20 and 22 that are spaced apart by the length L. In this embodiment, the inflator 12 is positioned approximately midway between the opposed ends 20 and 22 in a recessed area 19. The recessed area 19 has a pair of opposed edges 21a and 21b, as best shown in FIG. 4. The airbag cushion 11 has a pair of edges 27 and 28 that join the airbag housing 13. In the embodiment of FIG. 3, these edges are interconnected with the housing adjacent the edges 21a and 21b of the recessed area 19. These edges 27 and 28 define an opening through which gas flows from the inflator 12 into the cushion 11. These edges 27 and 28 are positioned substantially inboard from the edges 20 and 22 of the airbag housing 13. A preferred inflation pattern for the airbag cushion 11 is shown in the dashed lines in FIG. 3. As shown, as the cushion initially inflates, it unfolds and expands radially from the airbag housing 13, as shown by the innermost dashed line. As the cushion 11 continues to inflate, as shown by the second dashed line and the solid line, the portion of the airbag laying in the airbag housing adjacent the edges 20 and 22 of the housing 13, moves generally radially away from the airbag housing until it takes the shape shown in the solid line of FIG. 3.

Figure 5:
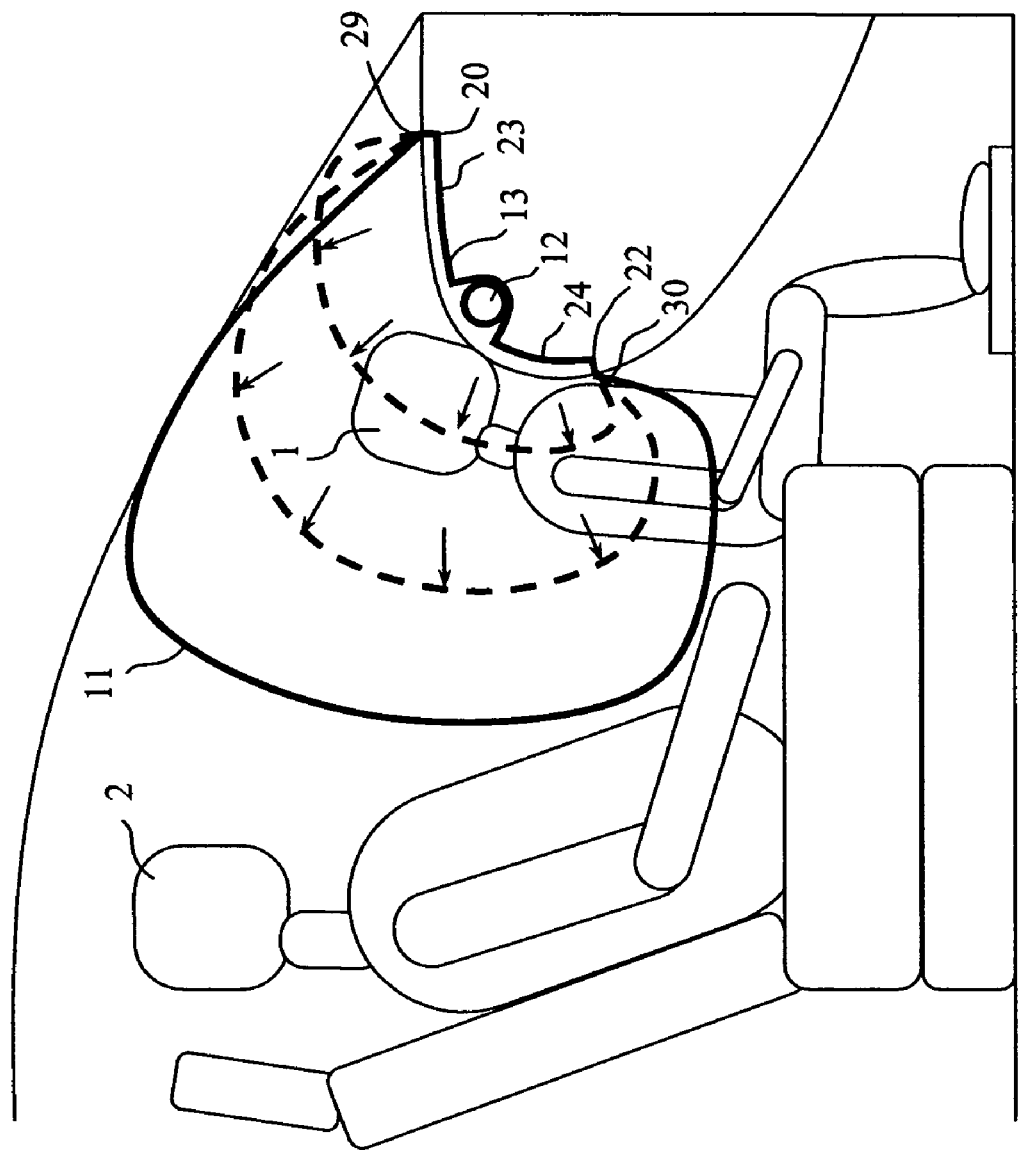
FIG. 5 is a side view of another embodiment of the passenger airbag according to the present invention with an out-of-position child dummy and an in-position adult dummy.

Referring now to FIG. 5, an alternative version of an airbag cushion 11 is shown which has opposed edges 29 and 30 that are interconnected or adjacent to the opposed edges 20 and 22 of the housing 13. As such, these edges 29 and 30, which define an opening for allowing gas from the inflator to enter the cushion 11, are spaced apart by a substantial distance, similar to the length L. As will be clear to those of skill in the art, cushion material may also be interconnected with other portions of the housing. Referring again to FIG. 5, the first edge 29 is connected with the housing 13 on the top of the instrument panel while the second edge 30 is connected with the housing 13 on the front or mid-portion of the instrument panel and the two edges are spaced apart by a distance similar to the length L in FIG. 4. That is, the edges may be spaced apart by at least 10 inches, or at least 12 inches or more.

Referring to FIGS. 3-5, the housing 13 of the airbag system is preferably curved so as to follow the contours of the instrument panel. It may be said to have a top portion 23 disposed in the top of the instrument panel and a front or mid-portion 24 disposed in the front or mid-portion of the instrument panel. The top portion 23 and the mid or front portion 24 may be both said to have cushion-receiving faces 25 and 26, respectively, as shown in FIG. 4. In the embodiment of FIG. 4, the top portion 23 of the housing 13 is generally horizontal while the mid or front portion 24 is generally vertical. Preferably, these portions are angled with respect to each other with an angle T of at least 30 degrees, with at least 45 degrees being more preferred and, for some versions, at least 60 degrees being most preferred. The angles referred to may be considered to be the angle between the faces 25 and 26 immediately adjacent the edges 20 and 22. In the embodiment of FIG. 4, the angle T between the surfaces 25 and 26 is greater than 90 degrees.

An upper limit for the angle T is constrained by functional considerations and the design of the instrument panel. It is unlikely that such considerations would allow the angle T to be as large as 180 degrees. A practical upper limit is probably 120 degrees. In the illustrated embodiments, the housing 13 is smoothly curved between the edges 20 and 22. Alternatively, the housing may have an angle or bend to follow the contours of an instrument panel, such that it has one or more generally planar portions. Again, it is preferred that the cushion-receiving surfaces adjacent the end portions be angled with respect to each other. In the illustrated embodiments, the cushion-receiving surface is generally parallel to the surface of the instrument panel. Alternatively, the surfaces may not be parallel. In this case, the discussion of angles above may apply to the instrument panel surface. That is, the instrument panel surface immediately adjacent one edge of the airbag housing may be at an angle to the surface immediately adjacent the opposite edge. The angle may be at least 30 degrees, with at least 45 degrees being more preferred.

Referring again to FIGS. 3-5, it can be seen that the top portion 23 of the airbag housing 13 is generally larger than the front or mid-portion 24. This is a preferred configuration.

Even though the width of the airbag housing 13 of this embodiment of the present invention is preferred to remain about the same as the conventional airbag housing, it can be enlarged from the conventional size in order to further distribute the airbag cushion over the instrument panel. For a given width, the depth measured in a perpendicular direction to the instrument panel surface should decrease as the length increases in order to keep the housing volume the same as the conventional airbag. The airbag cushion, when fully deployed, preferably has about the same shape and volume as a conventional airbag cushion.

Figure 6:
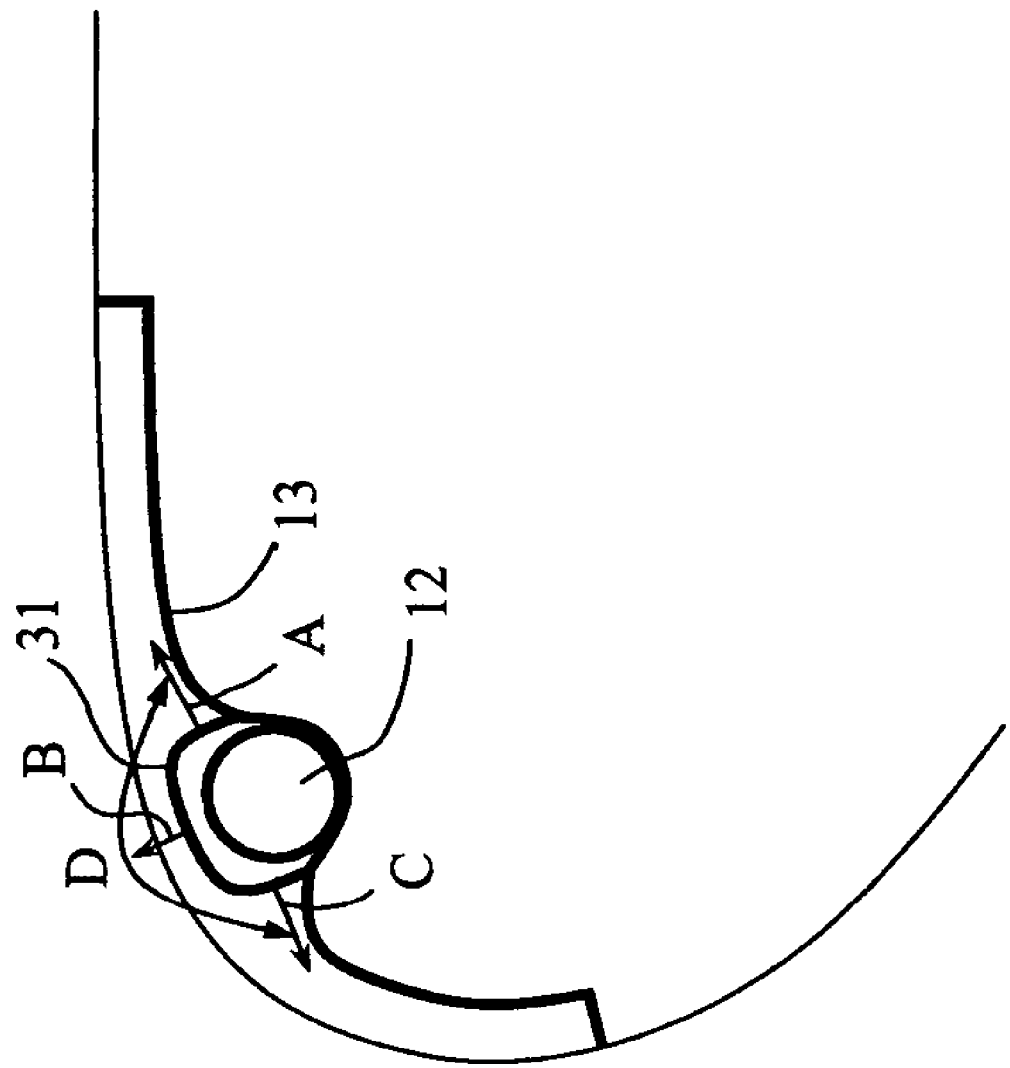
FIG. 6 is a side view of another embodiment of the present invention in which a diffuser of the present invention is used.

Though not shown in FIG. 4, a diffuser may be provided between the inflator 12 and the airbag cushion 11. FIG. 6 shows a preferred embodiment of a diffuser of the present invention. The inflator 12 can be located anywhere within the airbag module, though the center is a preferred location. Because of the long housing, the gas generated from the inflator may build up higher pressure near the inflator and lower pressure away from the inflator, which can generate undesirable cushion deployment. In order to avoid this problem, the diffuser 31 of the present invention has several surfaces with opening holes that aim different directions in order to control the way the airbag cushion is deployed. The diffuser of the present invention can help control the amount of gas flow generated by the gas generating inflator 12 in such a way that the airbag cushion can deploy in the intended manner of uniform and radial shape. The diffuser 31, if included, may have a variety of shapes and sizes, and may have holes or openings provided therein in a variety of arrangements. It is preferred that the diffuser 31 directs gas in at least three directions, as shown by arrows A, B and C in FIG. 6. It is also preferred that some of the gas flows are directed in generally opposed directions, as shown by arrows A and C. The angle between these gas flows A and C is shown as D as preferably greater than 90 degrees, with greater than 120 degrees being more preferred, and greater than 150 degrees being even more preferred. In some embodiments, the angle D is at least 150 degrees, and may be as much as 180 degrees or more. As a practical upper limit, the angle D should not be more than 270 degrees. The direction of each of the arrows A-C may be defined as being generally perpendicular to the surface of the diffuser 31 where the diffuser openings are located.

Figure 7A:
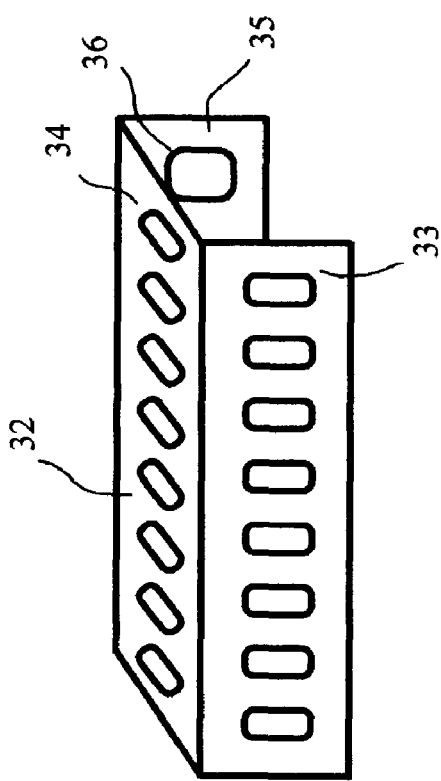
FIGS. 7a and 7b are perspective views of diffusers according to another aspect of the present invention.
Figure 7B:
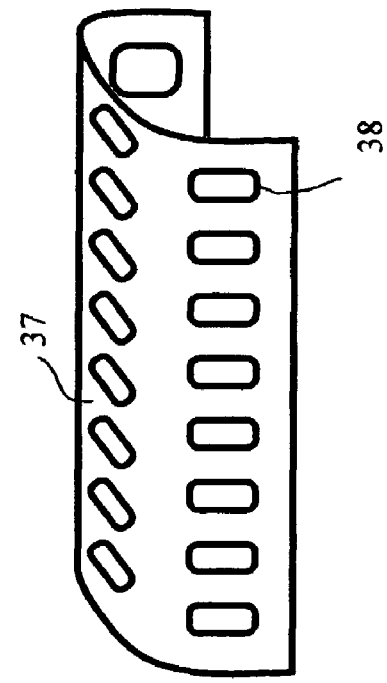

FIGS. 7a and 7b show two versions of a diffuser. The diffuser 32 of FIG. 7a has three surfaces 33, 34 and 35, each with openings 36 defined therethrough. Even though this embodiment of the diffuser 32 may have as many surfaces as needed, it is preferred to have three surfaces that are approximately at right angles as shown in FIG. 7a. The surfaces 33, 34 and 35 may be said to be provided each at an angle to the adjacent surface. As such, gas that passes through the openings in surface 33 and gas that passes through the openings in surface 35 will be going in generally opposed directions. As will be clear to those of skill in the art, the angles between the surfaces 33, 34 and 35 may be different than the angles illustrated, or additional surfaces may be provided. It is preferred that each of the surfaces be at an angle of at least 45 degrees to the adjacent surface and it is also preferred that the two end surfaces, such as 33 and 35, are angled with respect to each other by at least 90 degrees, with 150 or more degrees being more preferred, and 180-270 degrees being most preferred.

The amount of opening area and/or pattern of the opening holes on each surface 33, 34 and 35 can be made different from one another in order to fine-tune the cushion deployment. For example, it may be desirable to deploy the top portion of the airbag cushion faster than the bottom portion while maintaining the radial deployment because the top portion has farther to travel before it reaches the final shape of the cushion deployment. This effect can also distribute the airbag aggressiveness more evenly between the top portion and the bottom portion of the cushion deployment. The top portion of the cushion is generally safer than the bottom portion (mid or front portion of the instrument panel) due to the fact that it is located farther away from the out-of-position occupants. In order to achieve the different deployment speeds, the opening area can be further enlarged toward the top end of the airbag cushion. In FIG. 7a, the surface 35 has larger openings 36 so as to allow increased gas flow towards the top part of the airbag. Another way to send more gas to the top portion is to locate the inflator toward the top portion away from the preferred location of the center.

FIG. 7b shows another version of a diffuser 37 for use with the present invention. This version has a generally curved surface with openings 38 defined along the curve. It provides a similar function to the diffuser of FIG. 7a, but may be preferred for some applications. Again, it is preferred that the opening 38 provide airflow in generally opposed directions, which may be defined as in the range of 90-180 degrees, with a 180-270 degrees being more preferred. Openings are also preferably provided between the most opposed openings to provide airflow to the center of the airbag cushion. The direction of gas flow may be defined as a direction perpendicular to the surface of the diffuser 37 at the openings. As will be clear to those of skill in the art, the openings, such as 36 and 38, may vary in size and shape. Also, slots or angled openings may be provided, as needed.

Figure 8:
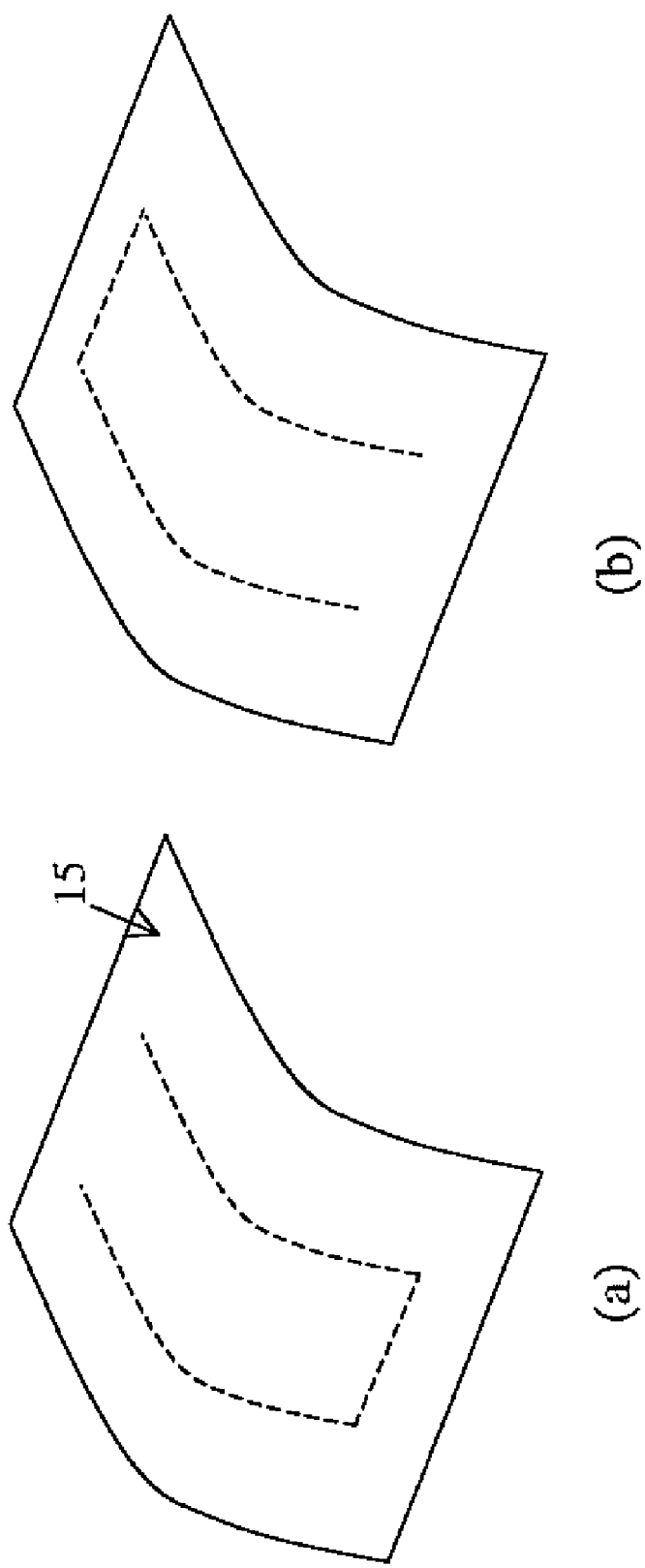
FIGS. 8(a) and (b) are perspective views of conventional U-type tear seams applied to the present invention.
Figure 9:
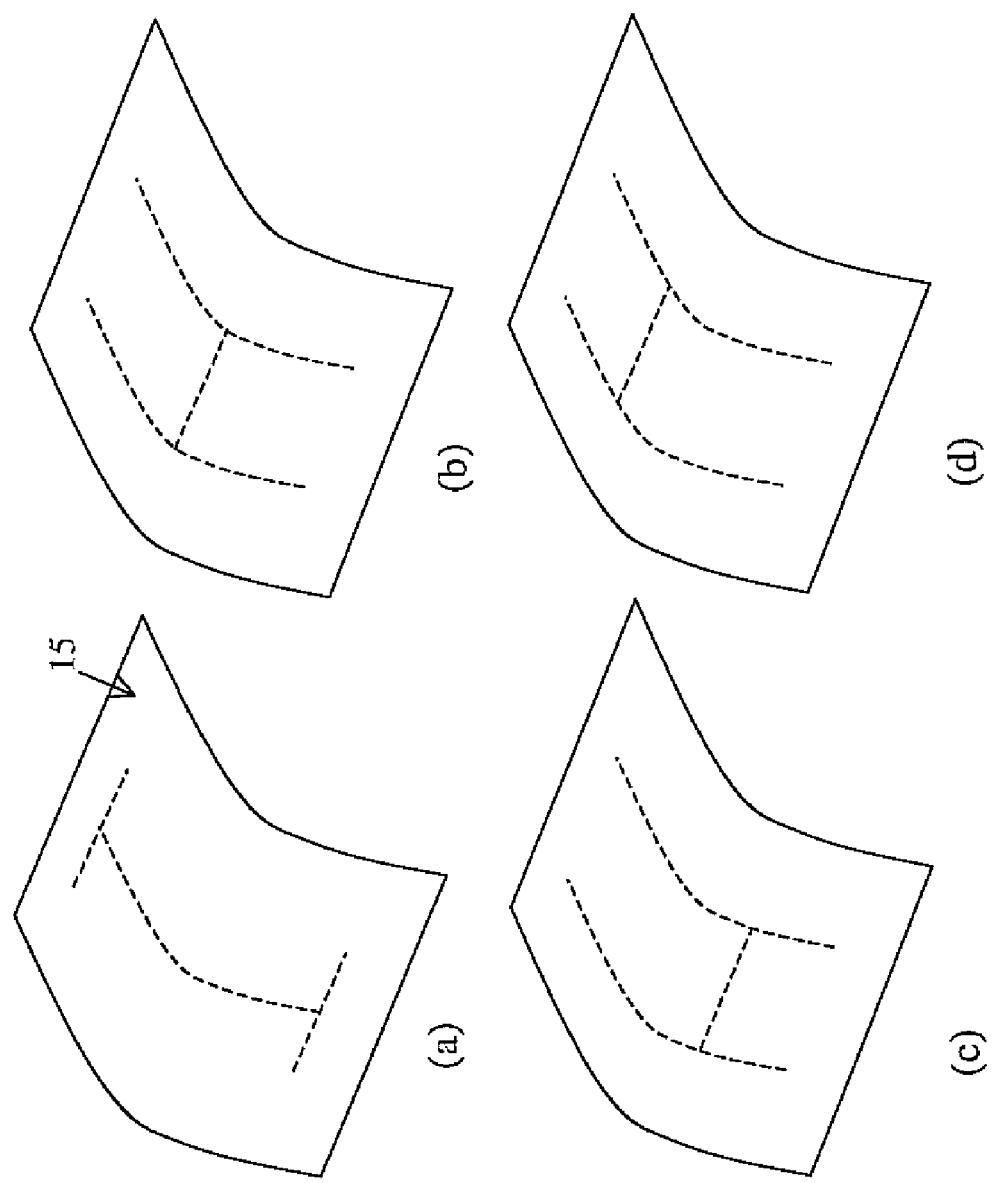
FIGS. 9(a)-(d) are perspective views of conventional I-type and H-type tear seams applied to the present invention.

It is preferred that the airbag system of the present invention use an instrument-panel-integrated airbag module that uses a tear seam instead of a door. Conventional tear seam designs include the U-type as shown in FIG. 8(a) and (b), and I-type and H-type as shown in FIGS. 9(a), (b), (c), and (d). Even though these conventional types may still be applicable to the airbag system of the present invention, they can be modified to further enhance the uniform and radial deployment.

Figure 10:
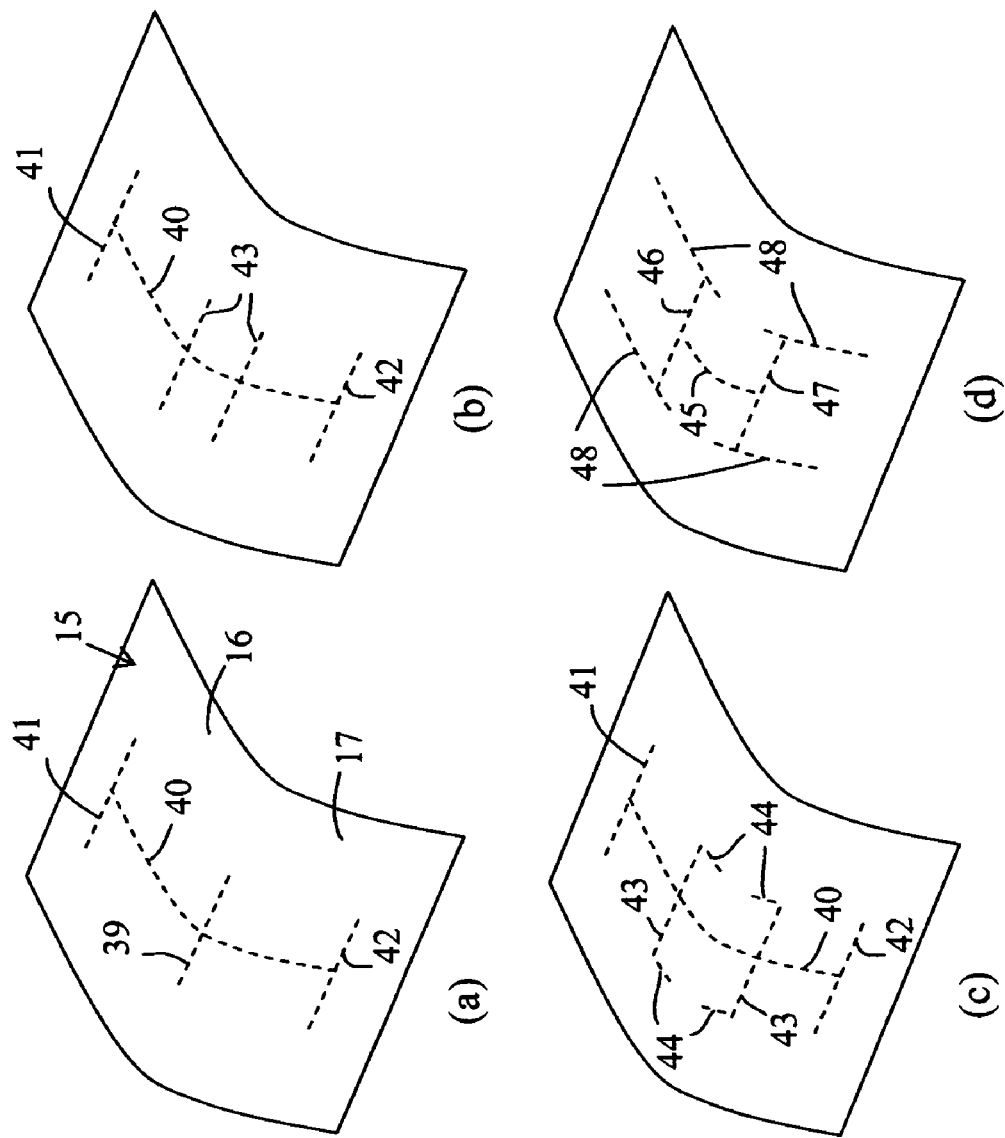
FIGS. 10(a)-(d) are perspective views of new tear seams according to yet another aspect of the present invention.

FIG. 10 shows modified tear seam designs according to a further aspect of the present invention. The tear seams are provided in the skin of the instrument panel, which may be considered an airbag cover. FIG. 10(a) shows a tear seam design that is a modification of a conventional I-type design as shown in FIG. 9(a). The tear seam design has an additional side-to-side tear seam 39. In total, the tear seam design may be said to have an elongated longitudinal tear seam 40, a pair of side-to-side tear seams 41 and 42 that intersect the ends of the longitudinal tear seam 40, and an additional side-to-side tear seam 39 that intersects the tear seam 40 between its ends. Preferably, the tear seam 39 is located where the instrument panel curves between the top portion 16 and the mid or front portion 17. The side-to-side tear seams 39, 41 and 42 are all generally parallel to each other and are each generally perpendicular to the longitudinal tear seam 40.

FIG. 10(b) shows another alternative tear seam design that is a modification of the design in FIG. 10(a). The design of FIG. 10(b) has the same longitudinal tear seam 40 and side-to-side tear seams 41 and 42. In place of the single side-to-side tear seam 39, a pair of generally parallel side-to-side tear seams 43 is provided, with each being generally parallel to the seams 41 and 42. FIG. 10(c) provides a further version of a tear seam design which is similar to the version of FIG. 10(b), but further includes small longitudinal tear seams 44 extending from the ends of the side-to-side tear seams 43. This design may be suitable for an instrument panel that is more curved. FIG. 10(d) has a tear seam design that combines I-type and H-type designs. The tear seam design of FIG. 10(d) has a longitudinal tear seam 45 with a pair of side-to-side tear seams 46 and 47 that intersect the ends of the tear seam 45. These tear seams, 45-47, provide an I-type tear seam design. The design in FIG. 10(d) further includes four longitudinal tear seams 48 that each intersect one of the ends of the tear seams 46 and 47 so as to provide a pair of H-type designs.

Figure 11:
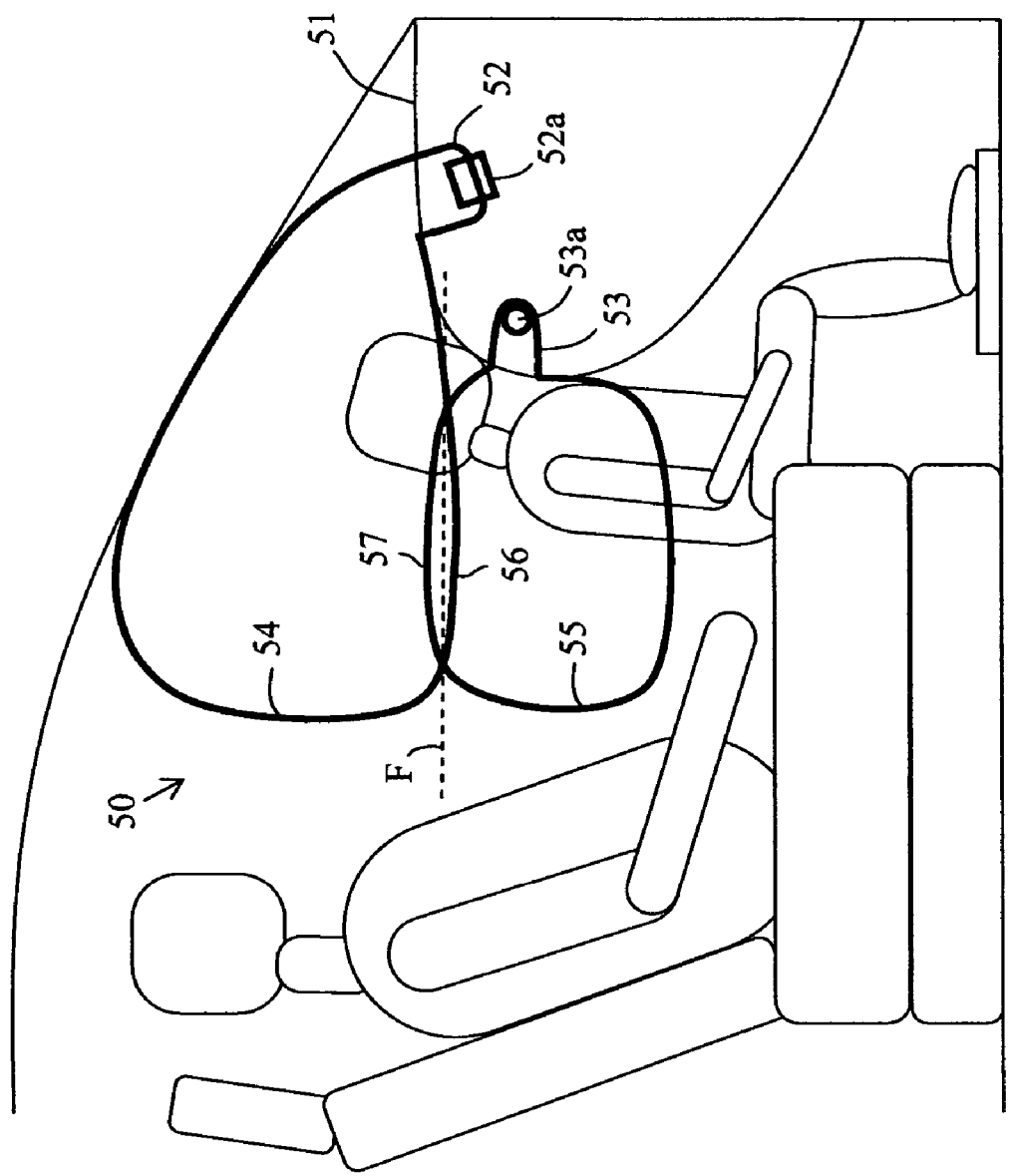
FIG. 11 is a side view of another embodiment of a passenger airbag system for the present invention.

Referring now to FIG. 11, an alternative embodiment of an airbag system according to the present invention is generally shown at 50. The airbag system is disposed in the instrument panel 51 and includes a top-mounted airbag housing 52 and a mid or front mounted airbag housing 53. A top-mounted airbag cushion 54 and a front mounted airbag cushion 55 are both deployable through the instrument panel 51. Both airbag cushions 54 and 55 are deployable along a predetermined path for direct contact with the occupant. Preferably, the predetermined path is generally horizontal. The top-mounted airbag cushion 54 deploys both obliquely along the windshield and horizontally towards the occupant, but preferably lacks a downward directional component relative to the occupant, which is a risky component to the neck of an out-of-position occupant and to the face of an infant riding in a rear facing child seat. The mid or front mounted airbag cushion 55 may deploy along both a generally horizontal and downward path towards the occupant, but preferably lacks any substantial upward deployment direction, which is a risky component to the neck of an out-of-position occupant.

As shown, when the airbag cushions 54 and 55 are both deployed, they together define a shape similar to the larger airbag of the earlier embodiments. The top-mounted airbag is deployed above the mid-mounted airbag cushion 55 and the top-mounted airbag cushion 54 has a substantially larger volume to serve as a main airbag protecting the head and upper torso of the in-position occupant while the mid-mounted airbag serves as a supporting airbag protecting the lower torso of the in-position occupant and keeping the top-mounted airbag from dropping and/or skewing during the deployment and cushioning. In some embodiments, the top-mounted airbag cushion has a deployed volume at least 25 percent greater than the mid-mounted airbag cushion 55, while in other embodiments, the top-mounted airbag cushion has a volume at least 50 percent greater than the mid-mounted airbag cushion 55. The top-mounted airbag cushion 54 may have a deployed volume in the range of 60 to 120 liters, while the mid-mounted airbag cushion may have a volume range of between 30 and 70 liters. Other sizes may also be used.

Preferably, the two airbag cushions 54 and 55 have separate inflators, though a single inflator may be used to provide gas to both airbag cushions through some type of channel or opening. The top-mounted housing 61 may use a driver airbag inflator 52a with a proper adjustment of mechanical properties such as pressure and fill-time and the mid-mounted housing 62 may use a side curtain airbag inflator 53a with a proper adjustment. As shown in FIG. 11, the two airbag cushions 54 and 55 may come close to or contact each other at the end of the deployment stage generally along a line indicated at F. This line of contact F is preferably generally horizontal, though may be angled with respect to horizontal by up to plus or minus 30 degrees. It is more preferred that the line be angled by between plus and minus 20 degrees and more preferred that it be angled plus or minus 10 degrees. It is also preferred that the line of contact F be at an angle less than the windshield angle such that it is not parallel to the windshield. In some versions, it may be an angle no greater than the windshield angle minus 5 degrees. For example, if a vehicle had a windshield with a 32 degree angle, it is preferred that the line of contract be angled no more than 27 degrees towards the windshield, though it could be angled downwardly away from the windshield within the limits stated above. For definitional purposes, the upper airbag cushion 54 may be said to have a lower surface 56, while the lower airbag cushion 55 may be said to have an upper surface 57. These surfaces may be generally adjacent and/or parallel to one another, and each may be generally adjacent and/or parallel to the line F. Preferably, both surfaces are generally horizontal, but may be angled in the range or plus or minus 30 degrees, more preferably plus or minus 20 degrees or most preferably plus or minus 10 degrees. The horizontal is generally considered to be the optimal angle as it best suits both for protecting in-position occupants and for reducing the risk of injuries caused by airbag inflation to the out-of-position occupant and the infant sitting in a rear facing child seat. Further aspects of this version of the present invention will be clear to those of skill in the art based on review of Applicants' co-pending application Ser. No. 10/909,581, the entire contents of which is incorporated herein by reference. Any of the teachings of Applicants' co-pending application may be combined with the teachings of the present disclosure.

Figure 12:
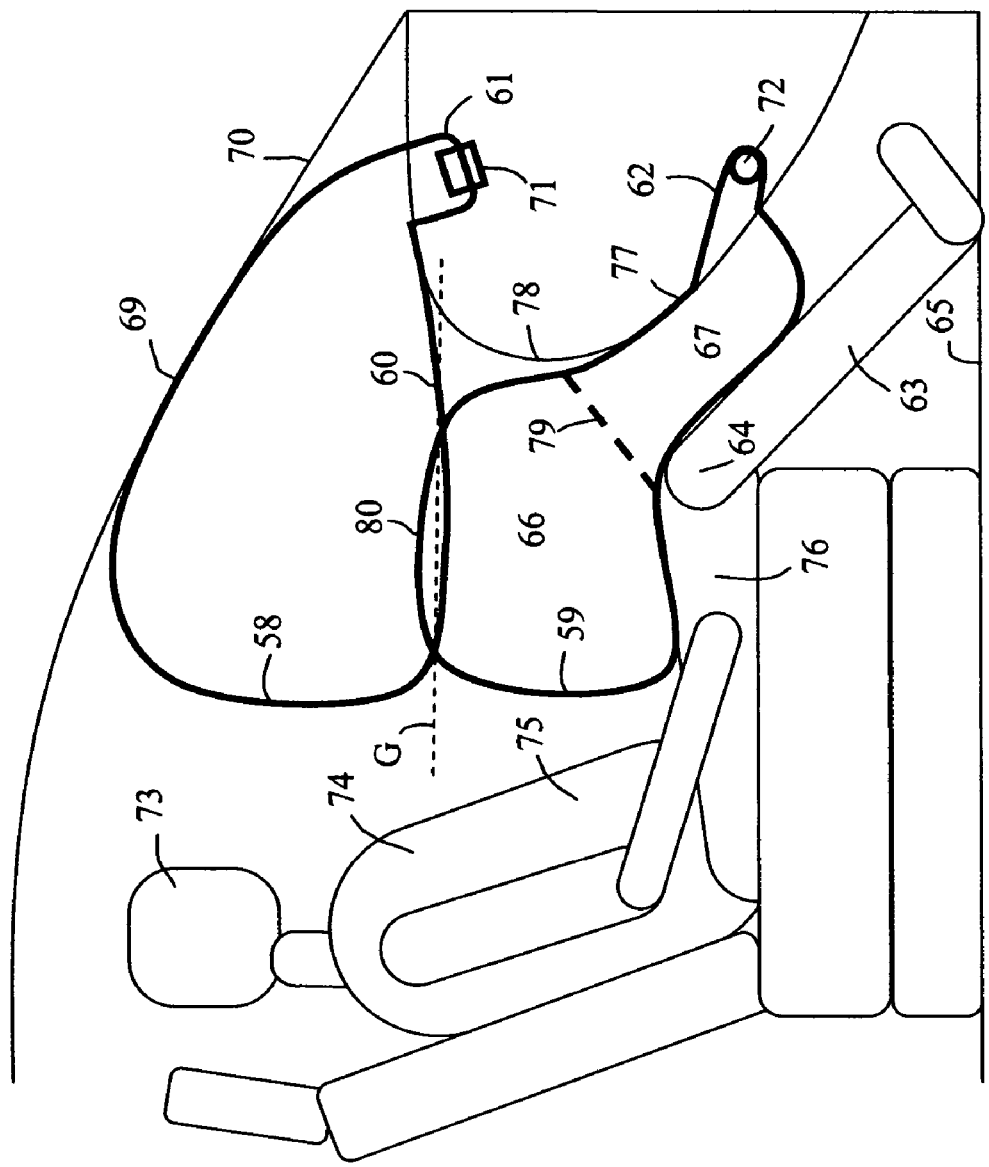
FIG. 12 is a side view of yet another embodiment of a passenger airbag system for the present invention.

FIG. 12 shows another alternative embodiment of an airbag system according to the present invention. The top-mounted housing 61 is mounted on the top portion of the instrument panel and may us a driver airbag inflator 71 with a proper pressure and fill-time adjustment. It deploys obliquely upward along the windshield 70 creating an upper cushion surface 69 after deployment, and deploys horizontally creating a lower cushion surface 60. This top-mounted airbag basically has the same features and benefits as the one shown in FIG. 11.

The low-mounted airbag housing 62 is mounted on the instrument panel below the level of the adult occupant's knees, preferably in the glove box area as a single unit or in a space below the glove box. For definitional purposes, the low-mounted airbag may be said to be disposed in a lower portion of the instrument panel below the mid-portion. The lower portion has a surface that is generally directed toward the occupant's lower extremities such as lower legs and feet. A side curtain airbag inflator 72 may be used with a proper adjustment if it has an enough capacity to fill the volume of the low-mounted airbag cushion. The cushion 59 first deploys into the space between the occupant's lower legs 63 and the lower portion of the instrument panel 77, and forms a cushion volume 67. The cushion 59 further travels and gets positioned into the open space created by four boundaries, namely the lower torso 75, the lower cushion surface of the top-mounted airbag 60, the mid or front portion of the instrument panel 78, and the upper legs 76, and forms a cushion volume 66 with an upper surface 80.

The lower part 67 of the cushion 59 serves to protect the occupant's knees 64, lower legs 63, and upper legs (femurs) 76. The upper part 66 serves to protect the occupant's lower torso 75 and supports the top-mounted airbag cushion 58 from falling and/or skewing during the deployment and cushioning. The airbag cushion 59 can be made of two chambers, as an alternative, in which the airflow is restricted by a membrane 79 through which the generated gas flows from the lower part 67 to upper part 66. This two chamber construction can help increase the pressure built up in the lower part 67 during the cushioning and help absorb more energy.

As shown in FIG. 12, the two airbag cushions 58 and 59 may come close to or contact each other at the end of the deployment stage generally along a line indicated at G. This line of contact G is preferably generally horizontal, though may be angled with respect to horizontal by up to plus or minus 30 degrees. It is more preferred that the line be angled by between plus and minus 20 degrees and more preferred that it be angled between plus and minus 10 degrees. As with line F, it is also preferred that the line of contact G be at an angle less than the windshield angle such that it is not parallel to the windshield. In some versions, it may be an angle no greater than the windshield angle minus 5 degrees. For example, if a vehicle had a windshield with a 32 degree angle, it is preferred that the line of contract be angled no more than 27 degrees towards the windshield, though it could be angled downwardly away from the windshield within the limits stated above. For definitional purposes, the upper airbag cushion 58 may be said to have a lower surface 60, while the lower airbag cushion 59 may be said to have an upper surface 80. These surfaces may be generally adjacent and/or parallel to one another, and each may be generally adjacent and/or parallel to the line G. Preferably, both surfaces are generally horizontal, but may be angled in the range of plus or minus 30 degrees, more preferably plus or minus 20 degrees or most preferably plus or minus 10 degrees. The horizontal is generally considered to be the optimal angle as it best suites both for protecting in-position occupants and for reducing the risk of injuries caused by airbag inflation to the out-of-position occupant and the infant sitting in a rear facing child seat. The upward directional component of the low-mounted airbag cushion 59 during the early stage of cushion deployment may not be risky to the neck of the out-of-position occupant as the inflator is located far away from the neck area.

The top-mounted airbag preferably serves as a main airbag. It protects the occupant's head and upper torso which are the major human body parts whose injuries can lead to fatality. The occupant's lower extremities such as the lower torso and legs are protected by knee bolster as well as the lower-mounted airbag. The knee bolster is an energy absorbing structure that is installed in the lower portion of the instrument panel and contacts primarily with the knees during a frontal crash event. The volume of the top-mounted airbag can range from 60 to 120 liters. The volume of the upper part 66 of the low-mounted airbag that is sitting above the occupant's upper legs can range from 30 to 70 liters. The volume of the lower part 67 of the low-mounted airbag that protects the knees and lower legs can range from 10 to 30 liters. It is preferred that the top-mounted airbag is larger than the upper part 66 of the low-mounted airbag. In some embodiments it can be at least 25 percent larger, or in other embodiments it can be at least 50 percent larger.

As will be clear to those of skill in the art, the herein-described embodiments of the present invention may be altered in various ways without departing from the scope or teaching of the present invention. It is the following claims, including all equivalents, which define the scope of the present invention.

We claim:

1. A passenger airbag system for an automotive vehicle having a passenger compartment, a windshield, and an instrument panel disposed between the passenger compartment and windshield, the instrument panel having an outer surface with a top portion which is more horizontal than vertical and generally directed toward the windshield and a mid portion which is more vertical than horizontal and generally directed toward an occupant in the passenger compartment, the passenger airbag system comprising:

an airbag housing disposed in the instrument panel, the housing having a first edge disposed in the top portion of the instrument panel and an opposed second edge disposed in the mid portion of the instrument panel, an airbag deployment opening being defined between the first and second edges and extending substantially the entirety of the distance from the first to the second edge, the airbag housing further having an airbag cushion receiving surface extending between the first and second edges, the airbag cushion receiving surface having a top portion adjacent the first edge and a front portion adjacent the second edge;

an airbag cushion deployable from the housing through the instrument panel, the airbag cushion deploying along a predetermined generally radial path through substantially the entirety of the airbag deployment opening, the air bag cushion being received in a non-deployed state on the airbag cushion receiving surface of the airbag housing and extending from the top portion to the front portion of the airbag receiving surface; and a single inflator and a diffuser disposed between the inflator and the airbag, the diffuser having a surface with openings defined therethrough, a first set of openings in the surface of the diffuser operable to direct gas flow into a top portion of the airbag cushion, and a second set of openings in the surface of the diffuser operable to direct gas flow into a mid portion of the airbag cushion.

2. The airbag system according to claim 1, wherein the top portion and front portion of the airbag cushion receiving surface being angled with respect to each other, the angle between the top portion and front portion of the airbag cushion receiving surface being between 30 and 120 degrees.

3. The airbag system according to claim 1, wherein the angle between the top portion and front portion of the airbag cushion receiving surface is at least 60 degrees.

4. The airbag system according to claim 1, wherein the airbag housing has portions adjacent the first and second edges that extend generally perpendicularly inwardly from the outer surface of the instrument panel.

5. The airbag system according to claim 1, wherein the first and second edges of the housing are spaced apart by a distance of at least 10 inches.

6. The airbag system according to claim 1, wherein the airbag cushion receiving surface is curved.

7. The passenger airbag system according to claim 1, wherein another set of openings is included in the surface of the diffuser operable to direct gas flow in a direction perpendicular to the instrument panel surface.

8. The passenger airbag system according to claim 1, wherein each set of openings in the surface of the diffuser define a total opening area for the surface, the total opening area for at least one of the sets of openings being different than the total opening area of each of the other sets.

9. The passenger airbag system according to claim 1, wherein the openings in the surface of the diffuser in one of the sets are larger than the openings in the surface of the diffuser in another of the sets.

10. The passenger airbag system according to claim 1, further comprising an airbag cover having a plurality of tear seams defined therein.

11. A passenger airbag system for an automotive vehicle having a passenger compartment, a windshield, and an instrument panel disposed between the passenger compartment and windshield, the instrument panel having an outer surface with a top portion which is more horizontal than vertical and generally directed toward the windshield and a mid portion which is more vertical than horizontal and generally directed toward an occupant in the passenger compartment, the passenger airbag system comprising:

an airbag housing disposed in the instrument panel, the housing having a first edge disposed in the top portion of the instrument panel and an opposed second edge disposed in the mid portion of the instrument panel, an airbag deployment opening being defined between the first and second edges, the airbag housing further having an airbag cushion receiving surface extending between the first and second edges;

an airbag cushion deployable from the housing through the deployment opening, the air bag cushion being received in a non-deployed state on the airbag cushion receiving surface of the airbag housing; and a single inflator and a diffuser disposed between the inflator and the airbag cushion, the diffuser having a surface with openings defined therethrough, a first set of openings in the surface of the diffuser operable to direct gas flow into a top portion of the airbag cushion, and a second set of openings in the surface of the diffuser operable to direct gas flow into a mid portion of the airbag cushion.

12. The passenger airbag system according to claim 11, wherein the airbag cushion is deployable along a predetermined path which is generally radial with respect to the outer surface of the instrument panel.

13. The passenger airbag system according to claim 12, wherein the predetermined path substantially lacks a downward or upward directional component relative to the occupant.

14. The passenger airbag system according to claim 11, wherein the airbag cushion receiving surface is curved.

15. The passenger airbag system according to claim 11, wherein another set of openings is included in the surface of the diffuser operable to direct gas flow in a direction perpendicular to the instrument panel surface.

16. The passenger airbag system according to claim 11, wherein the openings in the surface of the diffuser define a total opening area for the surface, the total opening area for at least one of the sets of openings being different than the total opening area of each of the other sets.

17. The passenger airbag system according to claim 11, wherein the openings in the surface of the diffuser in one of the sets are larger than the openings in the surface of the diffuser in another of the sets.

18. The passenger airbag system according to claim 11, further comprising an airbag cover having a plurality of tear seams defined therein.

* * * * *